US006671287B1

(12) United States Patent
Huttunen et al.

(10) Patent No.: US 6,671,287 B1
(45) Date of Patent: Dec. 30, 2003

(54) DATA TRANSMISSION METHOD IN GPRS

(75) Inventors: Kari Huttunen, Oulu (FI); Arto Savuoja, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/519,971

(22) Filed: Mar. 7, 2000

Related U.S. Application Data (63) Continuation of application No. PCT/FI98/00713, filed on Sep. 11, 1998.

(30) Foreign Application Priority Data

Sep. 12, 1997 (FI) .................................................. 973681

(51) Int. Cl.[7] ............................ H04J 3/16; H04J 3/22
(52) U.S. Cl. ...................................... 370/469; 370/465
(58) Field of Search ............................ 370/464, 465, 370/466, 469, 310, 328, 338, 349; 379/59; 455/403, 422.1, 458, 460, 466

(56) References Cited

U.S. PATENT DOCUMENTS

| | | | |
|---|---|---|---|
| 5,537,408 A | | 7/1996 | Branstad et al. |
| 6,031,832 A | * | 2/2000 | Turina ........................ 370/348 |
| 6,311,054 B1 | * | 10/2001 | Korpela ...................... 455/406 |
| 6,317,421 B1 | * | 11/2001 | Wilhelmsson et al. ...... 370/328 |
| 6,320,873 B1 | * | 11/2001 | Nevo et al. .................. 370/466 |
| 6,356,759 B1 | * | 3/2002 | Mustajarvi .................. 455/450 |
| 6,434,133 B1 | * | 8/2002 | Hamalainen ................ 370/338 |
| 6,600,732 B1 | * | 7/2003 | Sevanto et al. ............. 370/349 |
| 2001/0009544 A1 | * | 7/2001 | Vanttinen et al. ........... 370/338 |
| 2002/0075820 A1 | * | 6/2002 | Savuoja ...................... 370/310 |
| 2003/0039237 A1 | * | 2/2003 | Forslow ...................... 370/352 |

FOREIGN PATENT DOCUMENTS

| | | |
|---|---|---|
| GB | 2315964 A | 2/1998 |

OTHER PUBLICATIONS

Copy of International Search Report for PCT/FI98/00713.

* cited by examiner

*Primary Examiner*—Wellington Chin
*Assistant Examiner*—Jamal A. Fox
(74) *Attorney, Agent, or Firm*—Squire, Sanders & Dempsey, L.L.P.

(57) ABSTRACT

The invention relates to a data transmission method between a network part of a General Packet Radio Service and a subscriber terminal. In the method an RLC/MAC (Radio Link Control/Medium Access Control) protocol layer and an LLC (Logical Link Control) protocol layer employing the services of the RLC/MAC protocol layer are used as data link layers. In data transmission an LLC frame of the LLC layer is placed in an RLC data block of the RLC/MAC layer. In accordance with the invention more than two LLC frames are placed in one RLC data block. According to prior art one RLC data block may comprise two different LLC frames at the most. The method is, for example, implemented in such a manner that when the RLC data block includes an RLC header field and an RLC data field then the RLC data block includes a mechanism accurately indicating the LLC frame length in each RLC data block and information about whether another LLC frame will follow said LLC frame or not.

4 Claims, 6 Drawing Sheets

DATA TRANSMISSION METHOD IN GPRS

This is a continuation of application Ser. No. PCT/FI98/00713, filed Sep. 11, 1998.

FIELD OF THE INVENTION

The invention relates to a data transmission method between a network part of a General Packet Radio Service and a subscriber terminal comprising: an RLC/MAC (Radio Link Control/Medium Access Control) protocol layer and an LLC (Logical Link Control) protocol layer employing the services of the RLC/MAC protocol layer as data link layers; in data transmission an LLC frame of the LLC layer is placed in an RLC data block of the RLC/MAC layer.

BACKGROUND OF THE INVENTION

A problem with the above arrangement is that it is not optimal. According to prior art LLC frames are not necessarily equally divided into RLC data blocks but one LLC frame may require more than one RLC data block so that the entire LLC frame can be transmitted over the radio path. An LLC frame can also be shorter than one RLC data block, therefore depending on the situation one RLC data block could hold several LLC frames. However, according to prior art two LLC frames can at the most be placed in an RLC data block. Then, if the RLC data block could in principle have held more than two LLC frames, e.g. three LLC frames, the unused capacity is lost according to prior art as it cannot be used.

BRIEF DESCRIPTION OF THE INVENTION

It is an object of the present invention to provide a method and equipment implementing the method so as to solve the above problem. This is achieved with the type of method presented in the preamble characterized by placing more than two LLC frames in one RLC data block.

The invention further relates to a cellular network using a general packet radio service comprising: a network part and at least one subscriber terminal, data transmission between the network part and the subscriber terminal, the network part and the subscriber terminal being arranged to perform data transmission using a protocol stack where an RLC/MAC (Radio Link Control/Medium Access Control) protocol layer and an LLC (Logical Link Control) protocol layer employing the services of the RLC/MAC protocol layer act as data link layers, the network part and the subscriber terminal being arranged to use transmission units for data transmission in such a manner that an LLC frame of the LLC layer is placed in an RLC data block of the RLC/MAC layer.

The cellular network is in accordance with the invention characterized by the network part and the subscriber terminal being arranged to locate more than two LLC frames in one RLC data block.

The preferred embodiments of the invention are disclosed in the dependent claims.

The invention is based on the idea that no limit is artificially set on how many LLC frames can be placed in one RLC data block.

The method and system of the invention provide several advantages. A valuable transmission capacity of the radio path is optimally utilized, since the data transmission capacity of the RLC data blocks is fully utilized in such situations where one RLC data block holds more than two LLC frames. Thus, the data transmission rate at the radio interface increases and the use of radio resources decreases.

BRIEF DESCRIPTION OF THE DRAWINGS

In the following the invention will be described in greater detail in connection with the preferred embodiments with reference to the accompanying drawings, in which.

DETAILED DESCRIPTION OF THE INVENTION

Figure 1A:
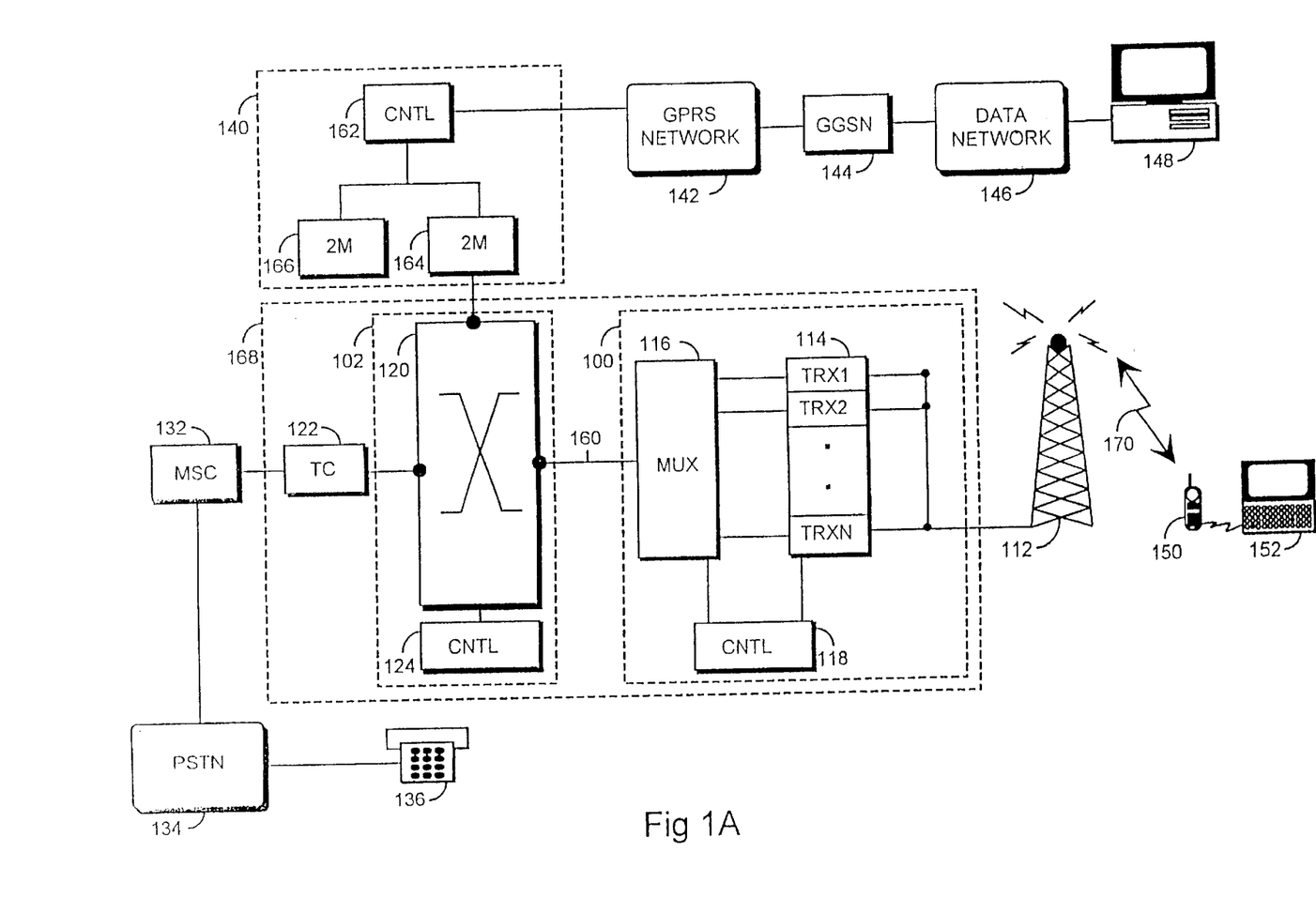
FIG. 1A is a block diagram showing a cellular network.

With reference to FIG. 1A a typical cellular network structure of the invention is described and its interfaces to a fixed telephone network and a packet transmission network. FIG. 1A includes only the blocks essential for describing the invention, but for those skilled in the art it is obvious that a conventional cellular network also includes other functions and structures, which need not be described here in greater detail. The invention is applicable to be used in basic GSM cellular networks and in networks further developed therefrom, like GSM1800 and GSM1900 systems. The invention is preferably used in a 2+-phase packet transmission of the GSM system, i.e. in the GPRS (General Packet Radio Service). Additional information on GPRS and the protocols used therein can be obtained, if needed, from ETSI (European Telecommunications Standards Institute) GPRS specifications, like ETSI GSM 03.60 and ETSI GSM 04.64.

The cellular network typically comprises a fixed network infrastructure, i.e. a network part, and subscriber terminals 150 which can be fixedly mounted, vehicle-mounted or hand-held portable terminals. The network part comprises base stations 100. Several base stations 100 are, in turn, controlled in a centralized manner by a base station controller 102 communicating with them. The base station 100 comprises transceivers 114, typically one to sixteen transceivers 114. One transceiver 114 offers radio capacity to one TDMA frame i.e. typically to eight time slots.

The base station 100 comprises a control unit 118 controlling the operation of the transceivers 114 and a multiplexer 116. The multiplexer 116 locates traffic and control channels used by several transceivers 114 to a single data link 160. The structure of the data link 160 is accurately determined and referred to as an Abis interface. The data link 160 is typically implemented using a 2 Mbit/s link, or a PCM link (Pulse Coded Modulation) offering a 31×64 kbit/s transmission capacity, while time slot 0 is allocated for synchronization.

There is a connection from the transceivers 114 of the base station 100 to an antenna unit 112 implementing a bidirectional radio connection 170 to a subscriber terminal 150. The structure of the frames to be transmitted also on the bidirectional radio connection 170 is accurately determined and referred to as an air interface.

The subscriber terminal 150 can be, for example, a standard GSM mobile phone to which a laptop computer 152, which can be used in packet transmission for ordering and processing packets, can for instance be connected using an additional card. Protocol processing can be placed in the subscriber terminal 150 and/or in the computer 152 connected to the subscriber terminal 150.

Figure 2:
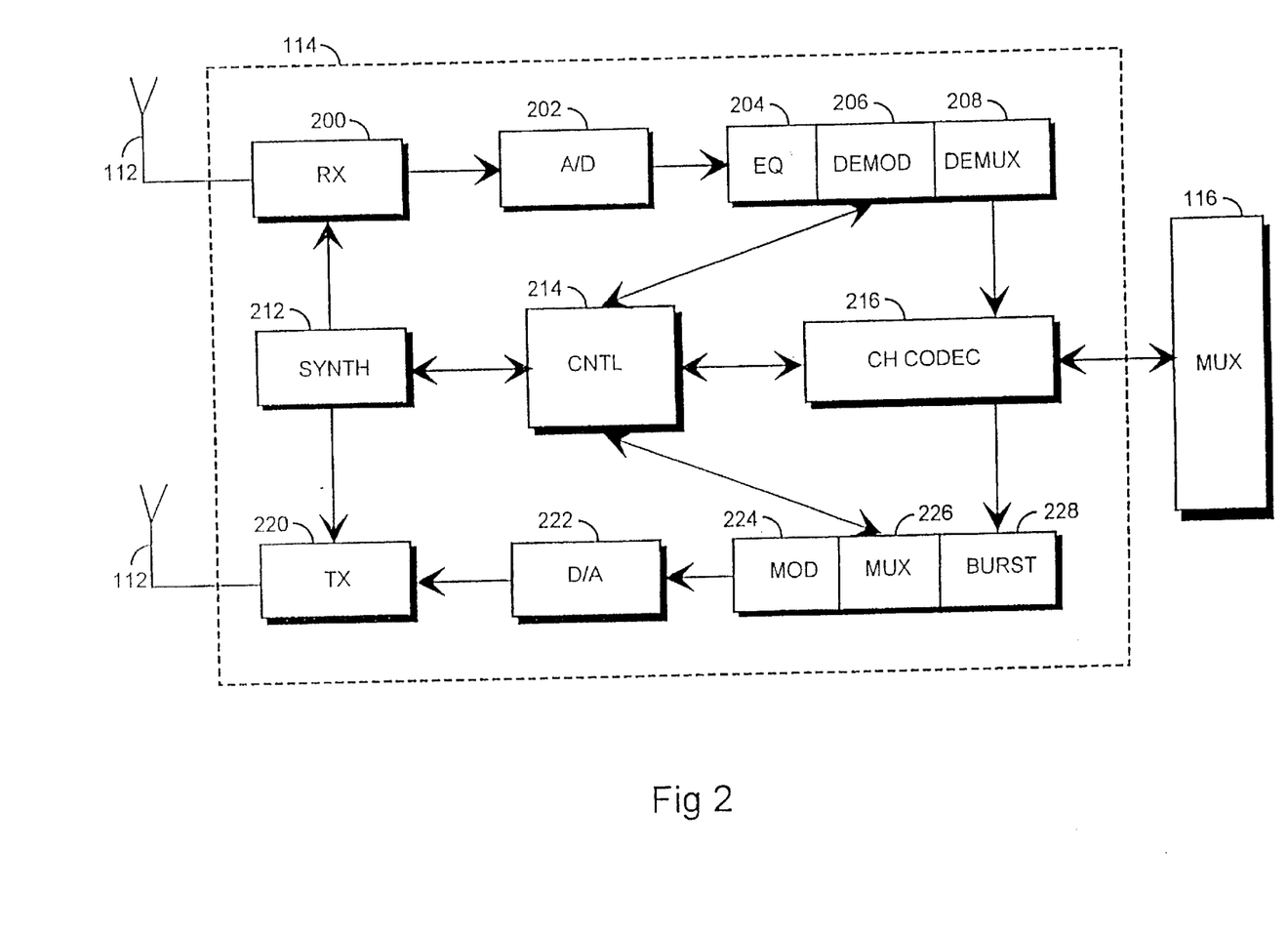
FIG. 2 shows the structure of one transceiver.

FIG. 2 shows the structure of one transceiver 114 in greater detail. A receiver 200 comprises a filter blocking frequencies outside a desired frequency band. Then a signal is converted to an intermediate frequency or directly to baseband, in which form the signal is sampled and quantized in an analogue-to-digital converter 202. An equalizer 204 compensates for interference caused by multipath propagation, for example. A demodulator 206 takes from the equalized signal a bit stream that is transmitted to a demultiplexer 208. The demultiplexer 208 separates the bit stream from different time slots into its logical channels. A channel codec 216 decodes the bit stream of different logical channels, i.e. decides whether the bit stream is signalling information transmitted to a control unit 214, or speech transmitted to a speech codec 122 of the base station controller 102. The channel codec 216 also performs error correction. The control unit 214 performs internal control functions by controlling various units. A burst former 228 adds a training sequence and a tail to the data arriving from the channel codec 216. A multiplexer 226 indicates to each burst its time slot. A modulator 224 modulates digital signals to a radio frequency carrier. This function is of analogue nature and therefore a digital-to-analogue converter 222 is needed to perform it. A transmitter 220 comprises a filter limiting the bandwidth. In addition, the transmitter 220 controls the output power of the transmission. A synthesizer 212 arranges the necessary frequencies for different units. The synthesizer 212 includes a clock that may be controlled locally or in a centralized manner from somewhere else, for example,.from the base station controller 102. The synthesizer 212 creates the necessary frequencies, for example, by a voltage-controlled oscillator.

The base station controller 102 comprises a group switching field 120 and a control unit 124. The group switching field 120 is used to switch speech and data and to connect signalling circuits. The base station 100 and the base station controller 102 form a base station subsystem also comprising a transcoder, also known as a speech codec, or a TRAU (Transcoder and Rate Adapter Unit) 122. The transcoder 122 is generally placed as close as possible to a mobile services switching centre 132, since speech can then be transferred in cellular network form between the transcoder 122 and the base station controller 102 saving transmission capacity.

The transcoder 122 converts different digital coding forms of speech used between a public switched telephone network and a cellular network to suit one another, for example, from the 64 kbit/s fixed network form to another cellular network form (e.g. 13 kbit/s) and vice versa. The control unit 124 performs call control, mobility management, statistical data collection and signalling.

As FIG. 1A shows the group switching field 120 can perform switching (indicated by black spots) to a public switched telephone network (PSTN) 134 through the mobile switching centre 132 and to a packet transmission network 142. A typical terminal 136 in the public switched telephone network 134 is an ordinary or an ISDN (Integrated Services Digital Network) phone.

The connection between the packet transmission network 142 and the group switching field 120 is established by a support node (SGSN=Serving GPRS Support Node) 140. The aim of the support node 140 is to transfer packets between the base station system and a gateway node (GGSN=Gateway GPRS Support Node) 144, and to keep record of the location of the subscriber terminal 150 within its area. The support node comprises several transmission units 164, 166 of 2 mega bytes, each being able to process PCM channels of at least one 2 mega bytes. In the Figure the transmission unit 164 is connected to the base station controller 102. Depending on the need of capacity a second transmission unit 166 could also be connected to the same base station controller 166 or to another base station controller. This connection is, however, not described in FIG. 1A. The transmission units 164, 166 communicate through a message bus with a control unit 162, through which the connections to the packet transmission network 142 are handled. Furthermore, the control unit 162 processes, for example, traffic statistics, billing data collection and location and space of the subscriber terminal 150. The functions of the transmission unit 164 include: encryption and decryption of user data, compression and decompression of user data, cancellation of user data from the LLC frames and location of user data in the LLC frames.

The gateway node 144 connects a public packet transmission network 146 and the packet transmission network 142. An Internet protocol or an X.25 protocol can be used at the interface. The gateway node 144 encapsules the internal structure of the packet transmission network 142 from the public packet transmission network 146, so for the public packet transmission network 146 the packet transmission network 142 resembles a sub-network, the public packet transmission network being able to address packets to the subscriber terminal 150 placed therein and to receive packets therefrom.

The packet transmission network 142 is typically a private network using an Internet protocol carrying signalling and tunnelled user data. The structure of the network 142 may vary operator-specifically concerning the architecture and protocols below the Internet protocol layer.

The public packet transmission network 146 may be, for example, a global Internet network, to which a subscriber terminal 148, for example a server computer, with a connection thereto wants to transfer packets to the subscriber terminal 150.

At the air interface 170 time slots not allocated to circuit-switched transmission are used for packet transmission. Capacity is dynamically allocated for packet transmission, i.e. when a data transmission request arrives any free channel can be allocated to be used in packet transmission. The arrangement is flexible, circuit-switched connections taking priority over packet data links. When necessary, circuit-switched transmission cancels out packet-switched transmission, i.e. a time slot engaged in packet transmission is passed on to circuit-switched transmission. This is possible, since packet transmission endures such interruptions well; the transmission is proceeded in another time slot allocated for use. The arrangement can also be implemented in such a manner that no definite priority is given to circuit-switched transmission, but both circuit-switched and packet-switched transmission requests are served in their order of arrival.

Figure 1B:
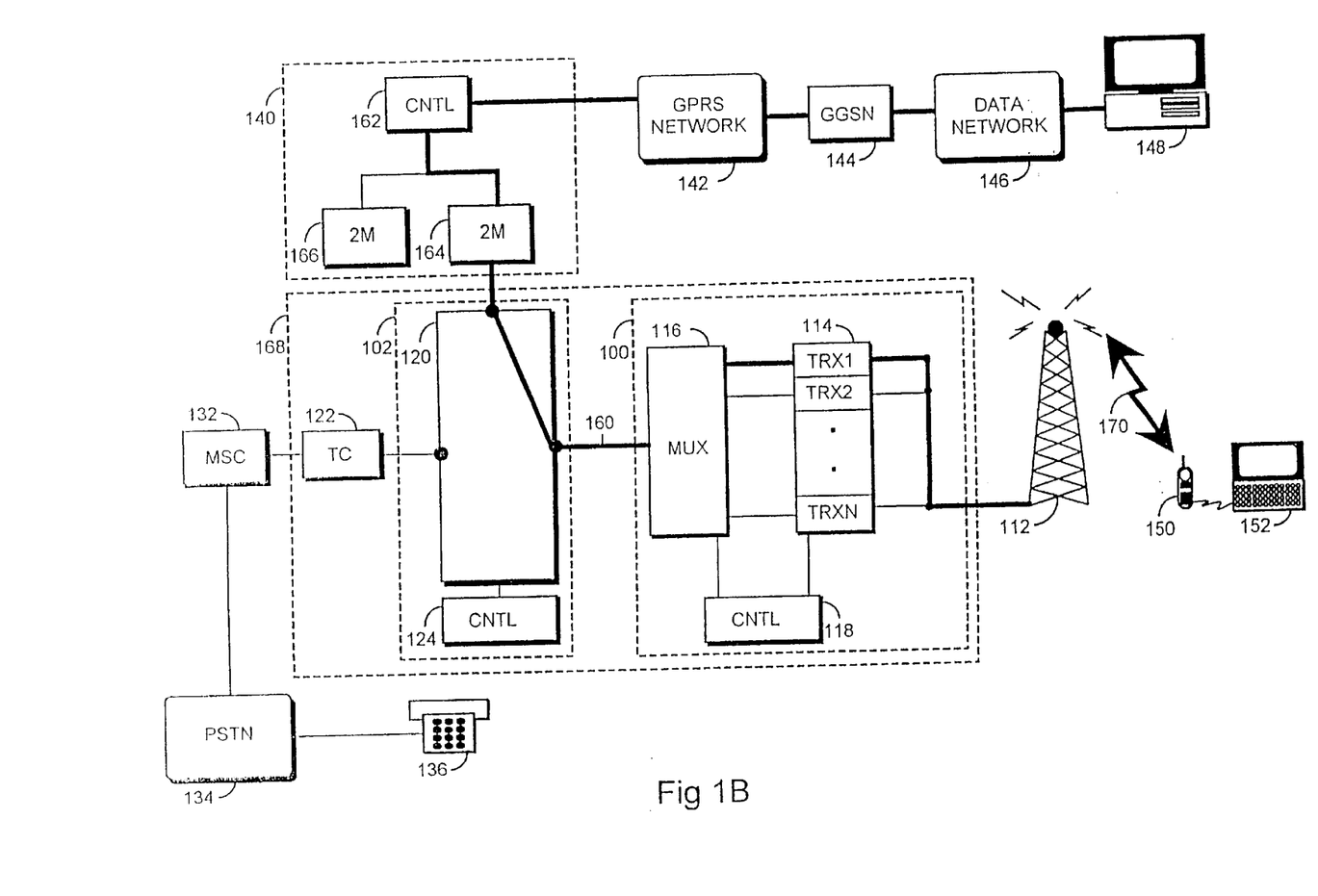
FIG. 1B shows circuit-switched data transmission.

Let us next take a look how packet data is transmitted in FIG. 1B. All structure parts described in FIG. 1B are found and explained in connection with FIG. 1A, and therefore not described herein. A laptop computer 152 is now connected to the subscriber terminal 150. A bold line describes how data to be transferred is carried from the laptop computer 152 to the server computer 148. Data can naturally also be transferred in the opposite direction too, from the server computer 148 to the laptop computer 152. Data is carried through the system at the air interface 170, from the antenna 112 to the transceiver 114 and from there multiplexed in the multiplexer 116 along the data link 160 to the group switching field 120, where a connection is established to the output of the support node 140. In the support node 140 data is carried through the transmission unit 164 and the control unit 162, from the support node 140 data is applied along the packet transmission network 142 through the gateway node 144 and is connected to the server computer 148 connected to the public packet transmission network 146.

Such a network can also be constructed, where circuit-switched data is not transferred at all, only packet data. Then the structure of the network can be simplified.

The invention is preferably implemented by software. The invention then requires relatively simple software changes within a strictly restricted area in the control unit 118 of the base station 100 and/or in the control unit 124 of the base station controller 102. The software can thus be divided in different ways between the above-mentioned control units depending on how the protocol processing is divided between different parts. Correspondingly the subscriber terminal 150 and/or the computer 152 connected thereto also require software changes in order to implement the protocol processing of the invention.

Although the examples show only a point-to-point packet data link between two parties, the invention is not restricted thereto, but it is obvious for those skilled in the art how the described arrangement can also be used, for example, in point-to-multipoint connections, where one party simultaneously transmits data to several other parties. The connection does not need to be bidirectional either; the invention enables bidirectional connections but a connection can also be uni-directional broadcast where the transmitter does not receive any acknowledgement from the receiver concerning the reception of the transmission. Different combinations are also possible, such as point-to-multipoint broadcast.

In the following a closer look is taken with reference to FIG. 3 at how protocol stacks used in the arrangement are formed. Like the conventional GSM arrangement, the GPRS transmission path protocol model is also constructed on the basis of an OSI (Open Systems Interconnection) protocol model of the International Standardisation Organisation.

Figure 3:
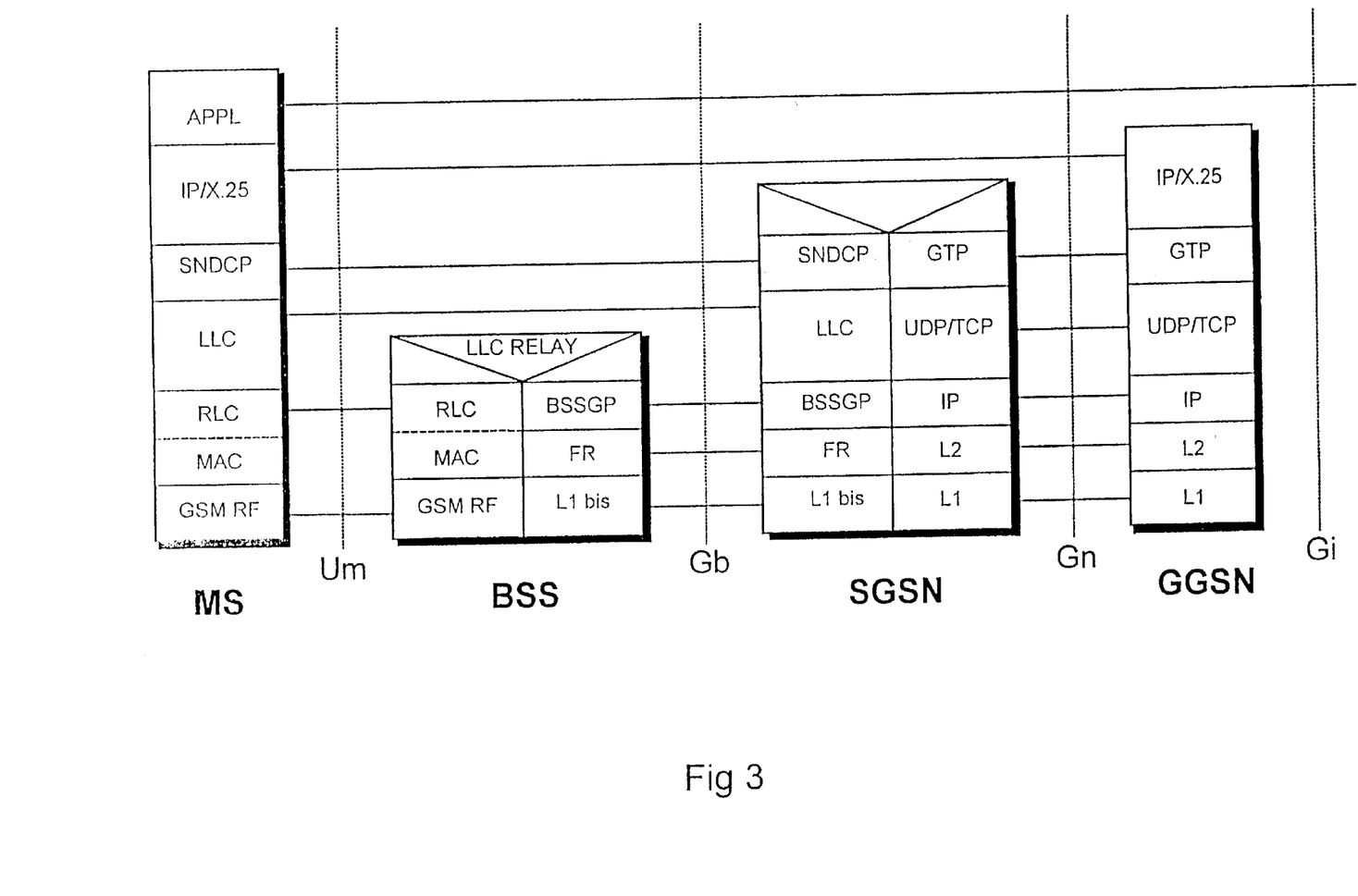
FIG. 3 shows protocol stacks of the system.

As to each protocol element FIG. 3 shows which protocol parts said network element processes. The network elements are: the mobile station (MS) 150, 152, the base station subsystem (BSS) 168, the support node (SGSN=Serving GPRS Support Node) 140 and the gateway node (GGSN= Gateway GPRS support node) 144. The base station 100 and the base station controller 102 are not described separately since no interface is determined between the two. The protocol processing determined for the base station arrangement 168 can thus in principle be freely divided between the base station 100 and the base station controller 102, however, in practice not to the transcoder 122 though it is included in the base station arrangement 168. Different network elements are divided by interfaces Um, Gb, Gn and Gi between them.

As the top level the protocol layers have an application level APPL. It shows user applications employing the GPSR system for data transmission. These applications are often ordinary programs intended for Internet use, like e-mail programs and world wide web.

IP/X.25 offers a connection to the Internet and other external data networks. For the external networks it uses a normal Internet IP protocol.

A GPRS tunnelling protocol GTP tunnels user data and signalling along the frame network between different GSNs. The GTP can, if desired, implement flow control between the SGSN 140 and the GGSN 144.

A TCP (Transmission Control Protocol) transfers the data packets of the GTP layer along the frame network to the protocols that need a reliable data link, for example, when using an X.25 protocol. A UDP (User Datagram Protocol) in turn transfers the data packets of the GTP layer whose protocol does not need a reliable link, for example, when using the Internet protocol IP. Through the IP the TCP produces flow control, and protection against disappearance and corruption for the packets to be transferred. The UDP correspondingly produces protection against packet corruption only.

The IP is the frame network protocol of the GPRS, the functions of which include routing of user data and control data. The IP can be based on an IPv4 protocol, but a shift to use an IPv6 protocol will later take place.

The most important functions of an SNDCP layer (Subnetwork Dependent Convergence Protocol) are: multiplexing several PDPs (Packet Data Protocol) into one SNDCP connection, compression and decompression of user data and compression and decompression of protocol control information. In addition, the SNDCP segments the data in higher network protocol form into lower LLC layer (Logical Link Control) form and vice versa.

The LLC layer implements a reliable encrypting logical link between the SGSN 140 and the MS 150. The LLC is independent and does not depend on lower layers so that the air interface change would affect the network part of the mobile network as little as possible. In addition, the LLC supports data frames of varying sizes, transmission of acknowledged and non-acknowledged data and data transmission from the SGSN 140 to several MSs 150 using the same physical radio channel. The LLC allows different priorities for the data so that higher priority data is transferred to the subscriber terminal before lower priority data. The information to be transferred and the user data are protected by encryption. Between Um and Gb interfaces the LLC data is transferred at an LLC-Relay level.

In addition to the higher layer data, a BSSGP level (Base Station Subsystem GPRS Protocol) carries information associated with routing and service quality between the BSS 168 and the SGSN 140. This information is physically delivered by an FR level (Frame Relay).

There are two separate functions at the RLC/MAC level: MAC (Medium Access Control) and RLC (Radio Link Control). The MAC is responsible for performing the following functions: multiplexing data and signalling on uplink (from the subscriber terminal to the network part) and downlink (from the network part to the subscriber terminal) connections, management of uplink resource requests and division and timing of downlink traffic resources. This level also includes management of traffic prioritization. The RLC attends to the transmission of LLC-level data, or LLC frames, to the MAC level; the RLC divides the LLC frames into RLC data blocks and transmits them to the MAC layer. In the uplink direction the RLC builds LLC frames from RLC data blocks which are transferred to the LLC layer. On the basis of a BCS (Block Check Sequence) of a CRC (Code Redundancy Check) calculated by the physical level the RLC level produces retransmission procedures of erroneous data. The physical level is implemented at Um interface on a radio connection, for example, at the determined air interface of the GSM. Modulation of the carrier wave, interleaving and error correction on the data to be transmitted, synchronization and transmitter power control are examples of functions performed at the physical level.

Figure 4A:
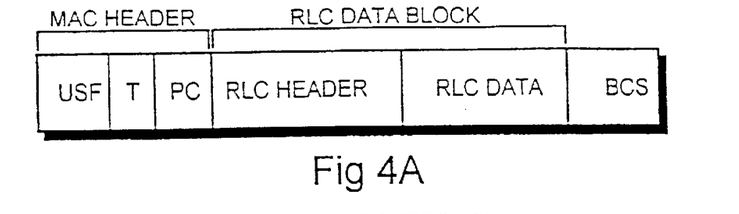
FIG. 4A shows a radio block, in which an RLC data block carrying LLC frames is placed
Figure 4B:
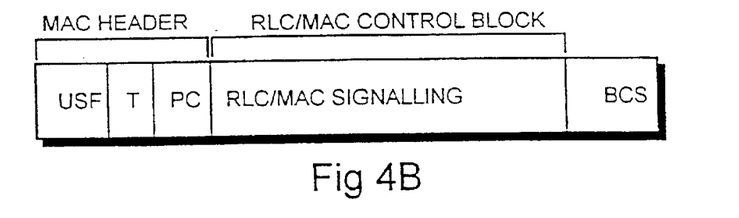
FIG. 4B shows a radio block in which an RLC/MAC control block carrying RLC/MAC signalling is placed.

FIGS. 4A and 4B illustrate the structure of a radio block. The radio block refers to a structure used at the RLC/MAC protocol layer. In the radio block of FIG. 4A the LLC frames are carried in the RLC data block and in the radio block of FIG. 4B the RLC/MAC signalling is carried in the RLC/MAC control block.

In FIG. 4A the radio block is formed of a MAC header field MAC HEADER, an RLC data block RLC DATA BLOCK and a block check sequence BCS.

The MAC header includes a USF (Uplink State Flag), a T (an indicator of radio block type) and a PC (Power Control). The RLC data block is formed of an RLC header field RLC HEADER and an RLC data field RLC DATA. The invention relates to the RLC data blocks in particular where the LLC frames are transparently transferred at the air interface 170 between the base station 100 and the subscriber terminal 150.

The radio block in FIG. 4B is formed of a MAC header field, an RLC/MAC control block and a block check sequence BCS. The RLC/MAC signalling is transferred only between the subscriber terminal 150 and the base station system 168. Signalling is used for maintaining a physical radio resource.

Figure 5:
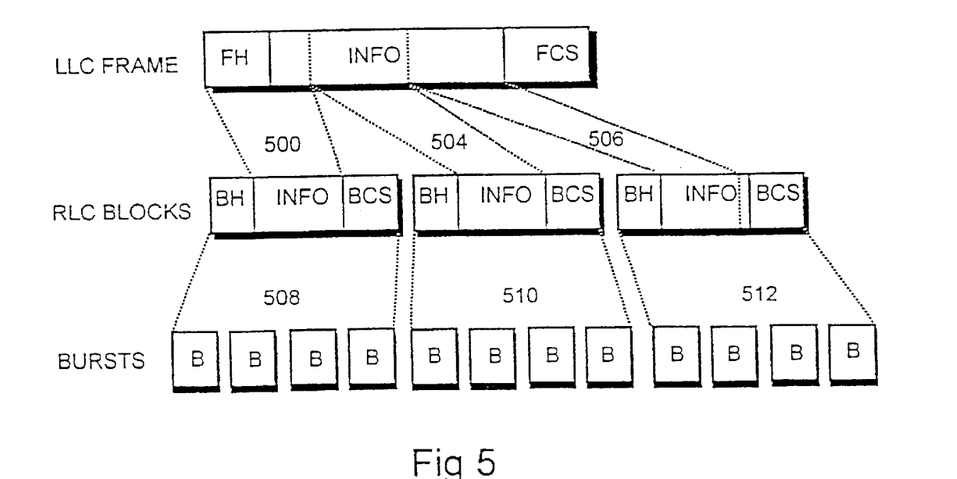
FIG. 5 shows by way of example how LLC frames are placed in radio blocks and radio bursts.

In FIG. 5 the data included in one LLC frame is placed in three radio blocks according to FIG. 4A, each radio block being placed in four normal radio bursts of the radio path 170. The LLC frame is formed in accordance with the Figure from a frame header FH, information INFO to be transferred and a frame check sequence FCS. The radio block consists of a block header BH, information INFO to be transferred and a block check sequence BCS, The BH corresponds to the MAC header field MAC HEADER and the RLC header field RLC HEADER in FIG. 4A.

The aim of the RLC/MAC protocol layer is thus to divide the LLC frames into smaller blocks so that they can be physically conveyed in the radio blocks over the radio path. The length of one LLC frame can be up to about 1600 octets. The LLC frame can also be very short, in which case the procedure of the invention can be used so that the transmission capacity of the radio block will be efficiently utilized.

Figure 6:
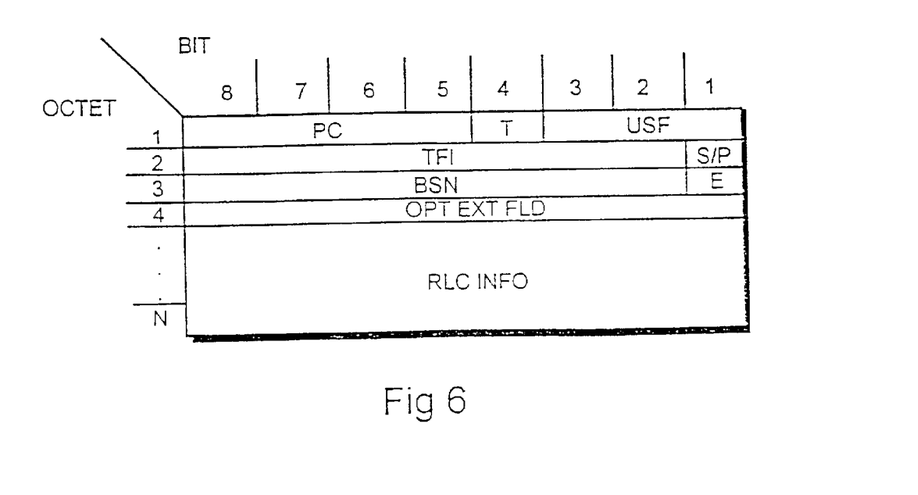
FIG. 6 shows the structure of an RLC data block.

FIG. 6 shows in greater detail the structure of the RLC data block which is interesting for the invention. Bits 1–8 forming one octet are shown in the horizontal plane. Octets 1–N are shown in the vertical plane. Octet 1 comprises a MAC header field so that bits 8–5 include a PC, bit 4 a T and bits 3–1 a USF. Octets 2–4 comprise an RLC header field so that bits 8–2 of octet 2 include a TFI (Temporary Flow Identity) and bit 1 an SiP (Supplementary/Polling Bit), bits 8–2 of octet 3 include a BSN (Block Sequence Number) and bit 1 an E (Extension Bit) and octet 4 an optional extension field OPT EXT FIELD. Octets 5–N comprise information RLC INFO to be transferred, i.e. the LLC frame data to be transferred.

The TFI is used to identify to which temporary block flow the RLC data block belongs. The network part determines an identifier for each temporary block flow.

The S/P is used for control and monitoring signalling.

The BSN is used to show the radio block sequence, where the collected blocks form one LLC frame.

The E is used to indicate whether the optional extension field is included or not. If the extension bit is not switched on, then all the following information to be transferred is included in one LLC frame. If the extension bit is switched on, then the extension field is included and belongs to the RLC header field.

The length of the extension field is thus one octet. The first 6 bits form a length indicator LI indicating how many octets from an RLC INFO field belong to the prevailing LLC frame.

The last byte in the LLC frame can be placed in the middle of the RLC data field, the LI then informing about the location of the last byte of the LLC frame.

In addition the extension field comprises two bits, the combination of which informs about the contents of a possibly incomplete RLC data field, One bit (M) shows whether the same radio block includes another LLC frame. If this is the case, then another bit (C) shows whether the entire second LLC frame is in this radio block or whether it continues in the following radio block.

Four different states can be indicated by the M and C bits:

1. A second LLC frame is found in the same RLC data field, and the entire second LLC frame is in said RLC data field.

2. A second LLC frame is found in the same RLC data field and this second LLC frame continues in the RLC data field of the following radio block.

3. A second LLC frame is not found in the same radio block but a temporary block flow continues.

4. A second LLC frame is not found in the same radio block and the temporary block flow ends.

This prior art definition has several weaknesses:

In the case of state 1 the length of the second LLC frame is not defined. Therefore in order to accomplish an operative system the base station 100 should upon receiving such a radio block transmit, to be sure, all remaining octets in the RLC data block to the SGSN 140 to ensure that the SGSN 140 is able to receive all the octets belonging to the second LLC frame.

In the case of state 1 unnecessary octets, which do not include any payload associated with the LLC frame, are carried in the uplink direction at the interface between the base station 100 and the base station controller 102 and/or at the interface between the base station controller 102 and the SGSN 140. The capacity of Abis and/or Gb interfaces is thus unnecessarily used. A solution to the problem is to include functions in the base station system 168 by which the contents of the LLC frame are examined and unnecessary octets are removed from the LLC frame. This is, however, difficult to carry out and does not really fit into the GPRS specifications since the LLC protocol is placed in the SGSN 140 and not in the base station system 168.

There is such a version of the state 1 case that the second LLC frame does not entirely fill the RLC data block, in which case the end transmitting the LLC frames cannot entirely utilize the transmission capacity, since there is no mechanism to inform that one or more LLC frames are found in said RLC data block. Valuable radio capacity is thus not fully utilized.

Figure 7A:
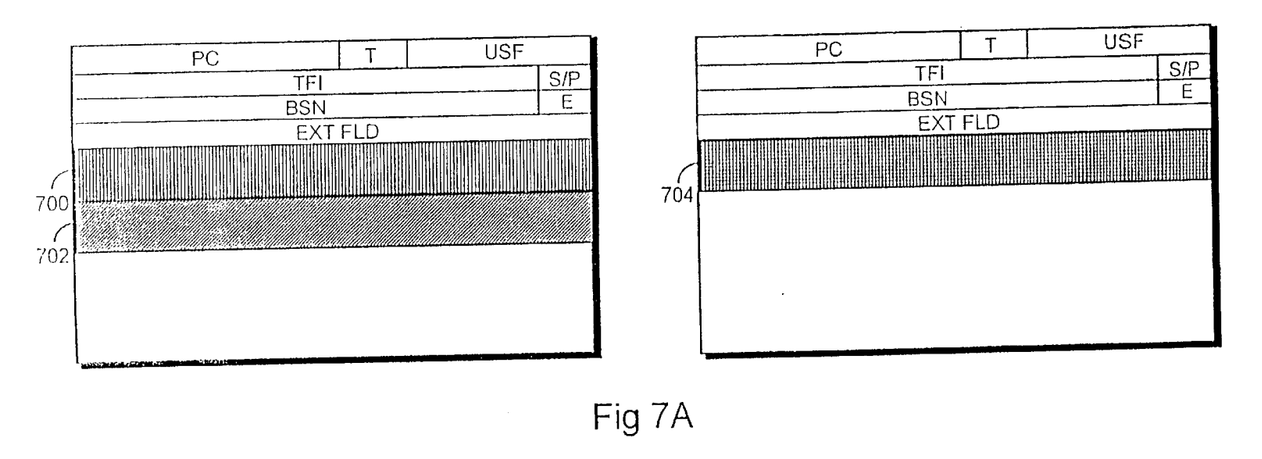
FIG. 7A shows how two LLC frames can, at the most, be placed in one RLC data block in accordance with prior art.

FIG. 7A shows how only a first LLC frame 700 and a second LLC frame can be placed in the first radio block. However, the first radio block has enough space for the third LLC frame 704, but since there is no mechanism to indicate the presence of a third LLC frame in the first radio block, the third LLC frame 704 cannot be placed in the RLC data block of the first radio block. The third LLC frame 704 is transferred using the RLC data block of the second radio block and the capacity of the RLC data block not used by the first radio block is therefore lost.

Figure 7B:
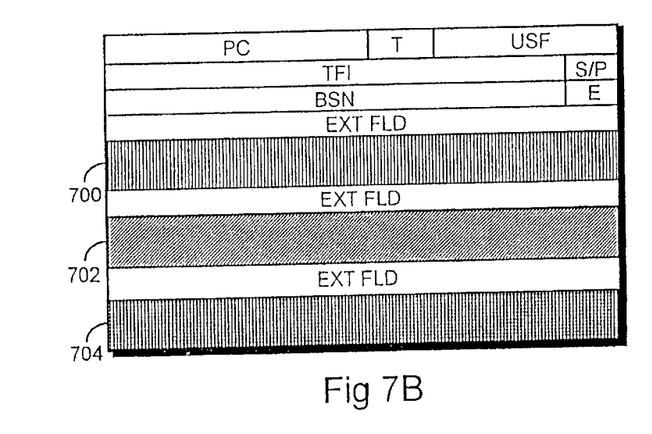
FIG. 7B illustrates how more than two, e.g. three, LLC frames can be placed in one RLC data block in accordance with the invention.

FIG. 7B shows a procedure of the invention. All three LLC frames 700, 702, 704 can be placed in the RLC data block of one radio block, and the capacity of the RLC data block will be entirely utilized as shown in the Figure.

The procedure in FIG. 7B can be implemented in such a manner that the RLC data block includes a mechanism accurately indicating the length of the LLC frame included in each RLC data block and the information on whether another LLC frame will follow after said LLC frame. FIG. 7B illustrates a way to implement the mechanism. There, the octet of the RLC data block, in which the preceding LLC frame ends, is always followed by a corresponding extension field than what is determined in accordance with prior art, if a new LLC frame is to be transmitted. This new extension field determines whether there is a next LLC frame in the same RLC data block. Furthermore the extension field determines the length of said LLC frame and whether said LLC frame can fit into the current RLC data block or whether it continues to the next RLC data block. The mechanism described can be applied until the entire RLC data block is filled with LLC frame data and thus the data stream of the LLC frames can be a continuous octet-shaped LLC data stream independent of the RLC data block limits.

The mechanism presented above is only one example of how more than two LLC frames can, if needed, be placed in one RLC data block. Even though the invention has been described above with reference to the example of the accompanying drawings, it is obvious that the invention is not restricted thereto but can be modified in various ways within the scope of the inventive idea disclosed in the attached claims.

What is claimed is:

1. A data transmission method between a network part of a General Packet Radio Service and a subscriber terminal comprising an RLC/MAC (Radio Link Control/Medium Access Control) protocol layer and an LLC (Logical Link Control) protocol layer employing the services of the RLC/MAC protocol layer as data link layers;

in data transmission an LLC frame of the LLC layer is placed in an RLC data block of the RLC/MAC layer, characterized by placing more than two LLC frames in one RLC data block.

2. A method as claimed in claim 1, characterized by an RLC data block comprising an RLC header field and an RLC data field, and the RLC data block including a mechanism accurately indicating the length of the LLC frame included in each RLC data block and information on whether another LLC frame will follow said LLC frame or not.

3. A cellular network using a general packet radio service comprising:

a network part and at least one subscriber terminal;

data transmission between the network part and the subscriber terminal;

the network part and the subscriber terminal being arranged to perform data transmission using a protocol stack where an RLC/MAC (Radio Link Control/ Medium Access Control) protocol layer and an LLC (Logical Link Control) protocol layer employing the services of the RLC/MAC protocol layer act as data link layers;

the network part and the subscriber terminal being arranged to use transmission units for data transmission in such a manner that an LLC frame of the LLC layer is placed in an RLC data block of the RLC/MAC layer, characterized by the network part and the subscriber terminal being arranged to locate more than two LLC frames in one RLC data block.

4. A cellular network as claimed in claim 3, characterized by the RLC data block comprising an RLC header field and an RLC data field, and the network part and the subscriber terminal being arranged to locate a mechanism in the RLC data block accurately indicating the length of the LLC frame included in the RLC data block and information about whether another LLC frame will follow said LLC frame or not.

* * * * *